(12) United States Patent
Kim et al.

(10) Patent No.: US 9,997,959 B2
(45) Date of Patent: Jun. 12, 2018

(54) WIRELESS POWER TRANSMISSION SYSTEM AND METHOD FOR INCREASING COUPLING EFFICIENCY BY ADJUSTING RESONANT FREQUENCY

(71) Applicant: Samsung Electronics Co., LTD., Suwon-si (KR)

(72) Inventors: Ki Young Kim, Yongin-si (KR); Eun Seok Park, Suwon-si (KR); Young Ho Ryu, Yongin-si (KR); Sang Wook Kwon, Seongnam-si (KR); Nam Yun Kim, Seoul (KR); Dong Zo Kim, Yongin-si (KR); Yun Kwon Park, Dongducheon-si (KR); Chang Wook Yoon, Yongin-si (KR); Jin Sung Choi, Gimpo-si (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 805 days.

(21) Appl. No.: 13/742,992

(22) Filed: Jan. 16, 2013

(65) Prior Publication Data
US 2013/0249306 A1    Sep. 26, 2013

(30) Foreign Application Priority Data
Mar. 23, 2012    (KR) .......................... 10-2012-0030164

(51) Int. Cl.
*H02J 50/80* (2016.01)
*H02J 50/50* (2016.01)
(Continued)

(52) U.S. Cl.
CPC .............. *H02J 17/00* (2013.01); *H02J 5/005* (2013.01); *H02J 7/025* (2013.01); *H02J 50/50* (2016.02); *H02J 50/80* (2016.02)

(58) Field of Classification Search
USPC ........................................................ 307/104
See application file for complete search history.

(56) References Cited

U.S. PATENT DOCUMENTS 8,766,483 B2 * 7/2014 Cook ...................... H02J 5/005
307/104
8,823,217 B2 * 9/2014 Tang ....................... H02J 5/005
307/104

(Continued)

FOREIGN PATENT DOCUMENTS

JP    2010-063245 A    3/2010
JP    2010-154592 A    7/2010
(Continued)

OTHER PUBLICATIONS

Korean Office Action dated Mar. 5, 2018, in corresponding Korean Application No. 10-2012-0030164 (10 pages in English, 6 pages in Korean).

*Primary Examiner* — Jared Fureman
*Assistant Examiner* — Emmanuel R Dominique
(74) *Attorney, Agent, or Firm* — NSIP Law

(57) ABSTRACT

A wireless power transmission system and a method for increasing a coupling efficiency by adjusting a resonant frequency are provided. A device of the wireless power transmission system includes a resonator configured to transmit a wireless power, and a communication unit configured to receive information from another device. The device further includes a controller configured to determine a power transmission efficiency based on the information, and adjust a resonant frequency of the device, a resonant frequency of a relay device, and a resonant frequency of the other device, if the power transmission efficiency is less than or equal to a predetermined reference efficiency.

5 Claims, 16 Drawing Sheets

(51) Int. Cl.
  *H02J 17/00*  (2006.01)
  *H02J 5/00*   (2016.01)
  *H02J 7/02*   (2016.01)

(56) References Cited

U.S. PATENT DOCUMENTS

| | | | |
|---|---|---|---|
| 2009/0146892 A1 | 6/2009 | Shimizu et al. | |
| 2010/0231053 A1* | 9/2010 | Karalis | B60L 11/182 307/104 |
| 2011/0018359 A1* | 1/2011 | Wada | B60L 11/182 307/104 |
| 2011/0049995 A1 | 3/2011 | Hashiguchi | |
| 2011/0121658 A1* | 5/2011 | Fukada | H02J 17/00 307/104 |
| 2011/0133569 A1* | 6/2011 | Cheon | H02J 17/00 307/104 |
| 2011/0175455 A1* | 7/2011 | Hashiguchi | H02J 5/005 307/104 |
| 2011/0175456 A1* | 7/2011 | Kozakai | H01Q 7/00 307/104 |
| 2011/0316349 A1* | 12/2011 | Hashiguchi | H02J 5/005 307/104 |
| 2012/0001497 A1* | 1/2012 | Sada | H02J 5/005 307/104 |
| 2012/0235634 A1* | 9/2012 | Hall | H03H 7/40 320/108 |
| 2013/0033118 A1* | 2/2013 | Karalis | H01F 38/14 307/104 |
| 2014/0084688 A1* | 3/2014 | Tzanidis | H01F 38/14 307/42 |

FOREIGN PATENT DOCUMENTS

| | | |
|---|---|---|
| JP | 2010-158151 A | 7/2010 |
| JP | 2010-183812 A | 8/2010 |
| JP | 2010-183813 A | 8/2010 |
| JP | 2010-233354 A | 10/2010 |
| JP | 2011-019291 A | 1/2011 |
| JP | 2011-030293 A | 2/2011 |
| JP | 2011-030317 A | 2/2011 |
| JP | 2011-030422 A | 2/2011 |
| JP | 2011-147280 A | 7/2011 |
| JP | WO2012/020475 A1 | 10/2013 |
| KR | 10-2010-0091112 A | 8/2010 |
| KR | 10-2011-0004321 A | 1/2011 |
| KR | 10-2011-0062841 A | 6/2011 |

* cited by examiner

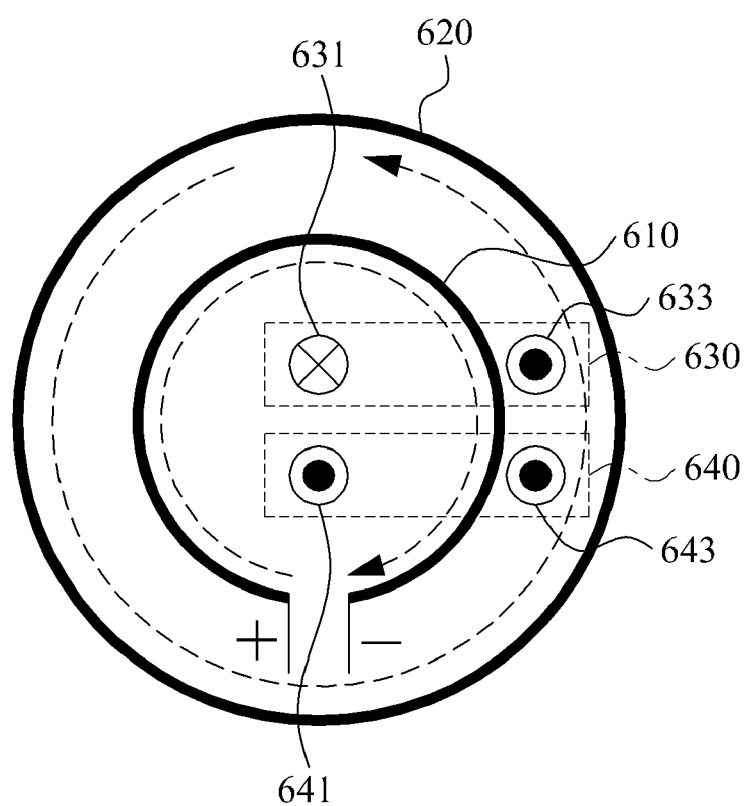

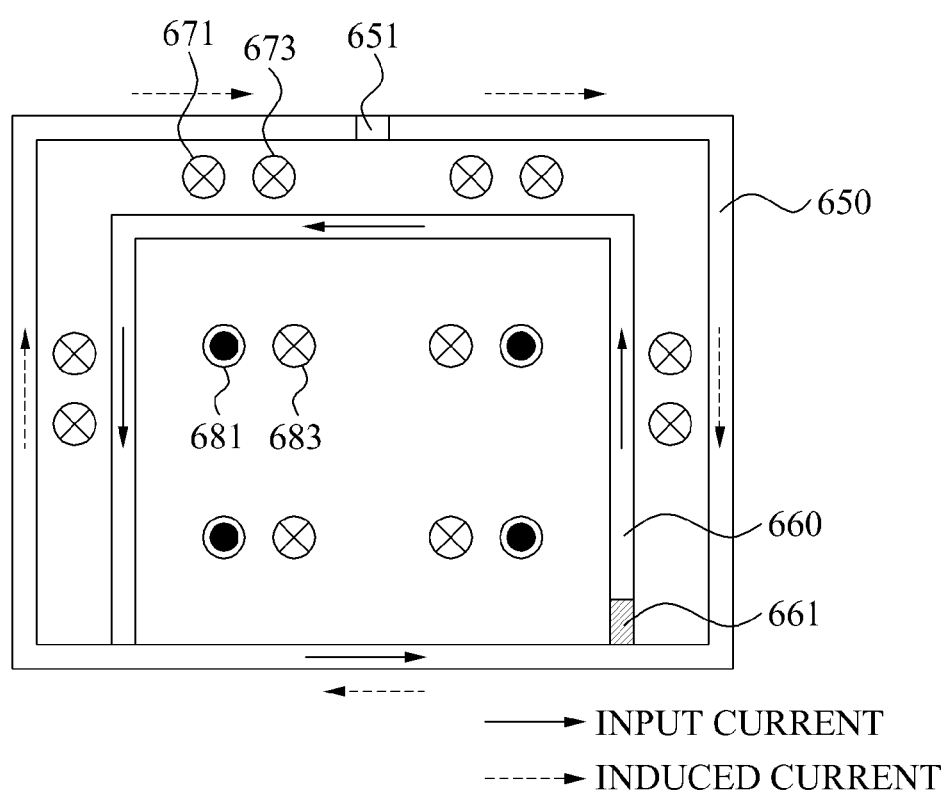

WIRELESS POWER TRANSMISSION SYSTEM AND METHOD FOR INCREASING COUPLING EFFICIENCY BY ADJUSTING RESONANT FREQUENCY

CROSS-REFERENCE TO RELATED APPLICATION(S)

This application claims the benefit under 35 U.S.C. § 119(a) of Korean Patent Application No. 10-2012-0030164, filed on Mar. 23, 2012, in the Korean Intellectual Property Office, the entire disclosure of which is incorporated herein by reference for all purposes.

BACKGROUND

1. Field

The following description relates to a wireless power transmission system and a method for increasing a coupling efficiency by adjusting a resonant frequency.

2. Description of Related Art

A wireless power transmission technology enabling a power supply without using a power line has been increasingly spotlighted. When the wireless power transmission technology is commercialized, energy may be easily supplied to a wired charging system. The wireless power transmission technology may enable charging at any time and anywhere, and may be a first step toward an environment enabling sharing of a power source between devices without a power source.

Wireless power refers to energy that is transferred from a wireless power transmitter to a wireless power receiver, for example, through magnetic coupling. A wireless power transmission system includes a source device and a target device. The source device wirelessly transmits a power, and the target device wirelessly receives the power. The source device may be referred to as a wireless power transmitter, and the target device may be referred to as a wireless power receiver.

The source device includes a source resonator, and the target device includes a target resonator. Magnetic coupling or resonance coupling may be formed between the source resonator and the target resonator.

When a satisfactory coupling efficiency is not secured due to a long distance between a source device and a target device, at least one relay resonator may be inserted between a source resonator and a target resonator, which may result in an increase in the coupling efficiency. In this example, a device including the relay resonator may be referred to as a relay device. The same resonant frequency may be used in all of the source resonator, the target resonator, and the relay resonator.

However, it is difficult to guarantee an optimum coupling efficiency, due to a gap between resonators, an arrangement of the resonators, different quality factors of the resonators, and/or other factors known to one of ordinary skill in the art.

SUMMARY

In one general aspect, there is provided a device of the wireless power transmission system, the device including a resonator configured to transmit a wireless power, and a communication unit configured to receive information from another device. The device further includes a controller configured to determine a power transmission efficiency based on the information, and adjust a resonant frequency of the device, a resonant frequency of a relay device, and a resonant frequency of the other device, if the power transmission efficiency is less than or equal to a predetermined reference efficiency.

In another general aspect, there is provided a device of a wireless power transmission system, the device including a resonator configured to receive a wireless power, and a communication unit configured to transmit information to another device, and receive a resonant frequency adjustment message from the other device. The device further includes a controller configured to adjust a resonant frequency of the resonator based on the resonant frequency adjustment message.

In still another general aspect, there is provided a method in a device of a wireless power transmission system, the method including transmitting a wireless power, and receiving information from another device. The method further includes determining a power transmission efficiency based on the information, and adjusting a resonant frequency of the device, a resonant frequency of a relay device, and a resonant frequency of the other device, if the power transmission efficiency is less than or equal to a predetermined reference efficiency.

In yet another general aspect, there is provided a method in a device of a wireless power transmission system, the method including receiving a wireless power, and transmitting information to another device. The method further includes receiving a resonant frequency adjustment message from the other device, and adjusting a resonant frequency of a resonator based on the resonant frequency adjustment message.

In another general aspect, there is provided a wireless power transmission system including a first device configured to transmit a wireless power, and determine a power transmission efficiency. The first device is further configured to adjust a resonant frequency of the first device, a resonant frequency of a relay device, and a resonant frequency of a second device, if the power transmission efficiency is less than or equal to a predetermined reference efficiency. The first device is further configured to transmit the adjusted resonant frequency of the relay device and the adjusted resonant frequency of the second device to the relay device and the second device, respectively. The wireless power transmission system further includes the relay device configured to relay the wireless power based on the adjusted resonant frequency of the relay device, and the second device configured to receive the wireless power based on the adjusted resonant frequency of the second device.

Other features and aspects will be apparent from the following detailed description, the drawings, and the claims.

BRIEF DESCRIPTION OF THE DRAWINGS

FIGS. 6A through 6B are diagrams illustrating examples of a distribution of a magnetic field in a feeder and a resonator of a wireless power transmitter.

Figure 1:
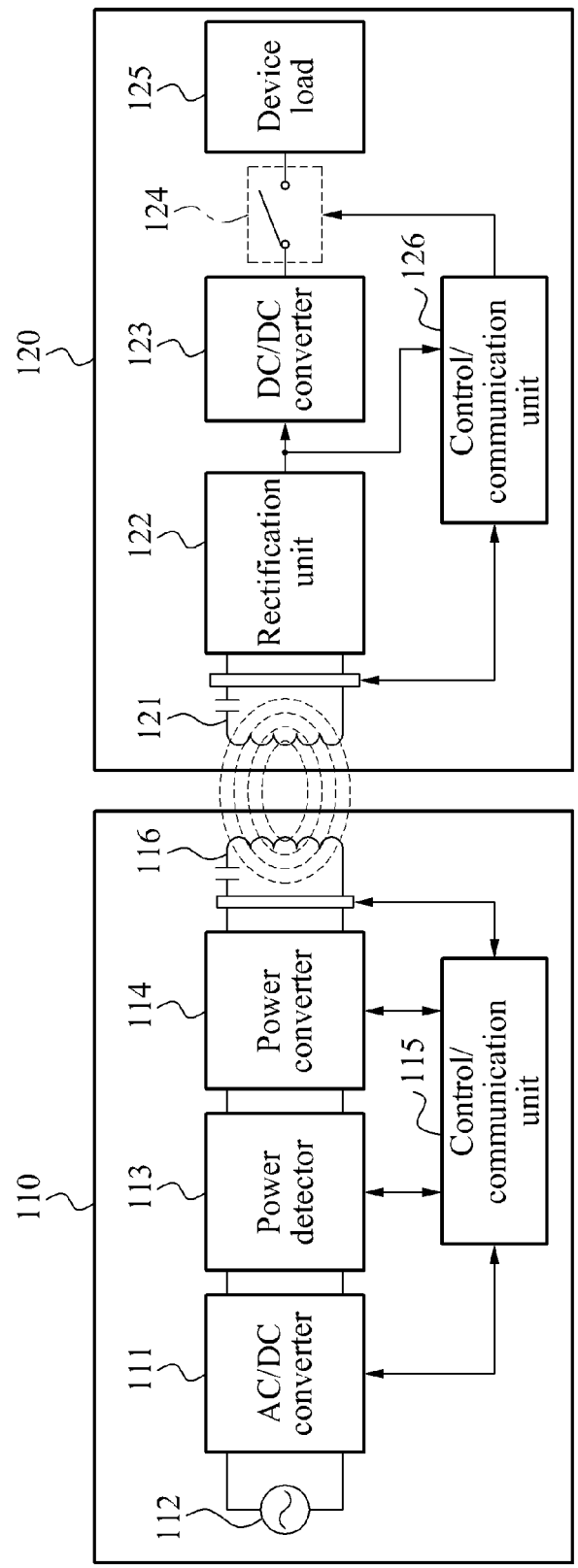
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a diagram illustrating an example of a wireless power transmission system. Referring to FIG. 1, the wireless power transmission system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes an alternating current-to-direct current (AC/DC) converter 111, a power supply 112, a power detector 113, a power converter 114, a control and communication (control/communication) unit 115, and a source resonator 116.

The target device 120 includes a target resonator 121, a rectification unit 122, a DC-to-DC (DC/DC) converter 123, a switch unit 124, a device load 125, and a control/communication unit 126.

The AC/DC converter 111 generates a DC voltage by rectifying an AC voltage having a frequency of tens of hertz (Hz) output from the power supply 112. The AC/DC converter 111 may output a DC voltage having a predetermined level, or may output a DC voltage having an adjustable level by the control/communication unit 115.

The power detector 113 detects an output current and an output voltage of the AC/DC converter 111, and provides, to the control/communication unit 115, information on the detected current and the detected voltage. Additionally, the power detector 113 detects an input current and an input voltage of the power converter 114.

The power converter 114 generates a power by converting the DC voltage output from the AC/DC converter 111 to an AC voltage using a switching pulse signal having a frequency of a few kilohertz (kHz) to tens of megahertz (MHz). In other words, the power converter 114 converts a DC voltage supplied to a power amplifier to an AC voltage using a reference resonant frequency $F_{Ref}$, and generates a tracking power to be used to track the resonant frequency, an operation power to be used to operate the target device 120, or a charging power to be used to charge a plurality of target devices. Additionally, the power converter 114 may generate the operation power based on a power transmission efficiency associated with a wireless power transmission and a dissipation power of the target device 120. For example, the control/communication unit 115 may determine an amount of a power transmitted to the target device 120 based on the information on the detected current and the detected voltage that is provided by the power detector 113. The control/communication unit 115 may determine the power transmission efficiency based on a ratio of the amount of the transmitted power to an amount of a power received at the target device 120. The tracking power may be, for example, a low power of 0.1 to 1 milliwatts (mW) that may be used by a target device to track the resonant frequency, and the operation power or the charging power may be, for example, a high power of 1 mW to 200 Watts (W) that may be consumed by a device load of a target device.

In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonant frequency" refers to a resonant frequency that is nominally used by the source device 110, and the term "tracking frequency" refers to a resonant frequency used by the source device 110 that has been adjusted based on a predetermined scheme.

The control/communication unit 115 determines the resonant frequency in which the power transmission efficiency associated with the wireless power transmission is greater than or equal to a predetermined value. The control/communication unit 115 performs a power control so that the amount of the power received by the target device 120 is maintained within a predetermined range, as will be described with reference to FIGS. 2 through 3.

The control/communication unit 115 may detect a reflected wave of the tracking power or a reflected wave of the charging power, and may detect mismatching between the target resonator 121 and the source resonator 116 based on the detected reflected wave. The control/communication unit 115 may detect the mismatching by detecting an envelope of the reflected wave, or by detecting an amount of a power of the reflected wave.

Also, the control/communication unit 115 may control a frequency of the switching pulse signal used by the power converter 114. By controlling the switching pulse signal used by the power converter 114, the control/communication unit 115 may generate a modulation signal to be transmitted to the target device 120. In other words, the control/communication unit 115 may transmit various messages to the target device 120 via in-band communication. Additionally, the control/communication unit 115 may detect a reflected wave, and may demodulate a signal received from the target device 120 through an envelope of the reflected wave.

The control/communication unit 115 may generate a modulation signal for in-band communication using various schemes. To generate a modulation signal, the control/communication unit 115 may turn on or off the switching pulse signal used by the power converter 114, or may perform delta-sigma modulation. Additionally, the control/communication unit 115 may generate a pulse-width modulation (PWM) signal having a predetermined envelope.

The control/communication unit 115 may perform out-of-band communication using a communication channel. The control/communication unit 115 may include a communication module, such as a ZigBee module, a Bluetooth module, or any other communication module, that the control/communication unit 115 may use to perform the out-of-band communication. The control/communication unit 115 may transmit or receive data to or from the target device 120 via the out-of-band communication.

The source resonator 116 transfers electromagnetic energy, such as the tracking power or the operation power, to the target resonator 121 via a magnetic coupling with the target resonator 121.

The target resonator 121 receives the electromagnetic energy, such as the tracking power or the operation power, from the source resonator 116 via a magnetic coupling with the source resonator 116. Additionally, the target resonator 121 receives various messages from the source device 110 via the in-band communication.

The rectification unit 122 generates a DC voltage by rectifying an AC voltage received by the target resonator 121.

The DC/DC converter 123 adjusts a level of the DC voltage output from the rectification unit 122 based on a voltage rating of the device load 125. For example, the DC/DC converter 123 may adjust the level of the DC voltage output from the rectification unit 122 to a level in a range from 3 volts (V) to 10 V.

The switch unit 124 is turned on or off by the control/communication unit 126. When the switch unit 124 is turned off, the control/communication unit 115 of the source device 110 may detect a reflected wave. In other words, when the switch unit 124 is turned off, the magnetic coupling between the source resonator 116 and the target resonator 121 is interrupted.

The device load 125 may include a battery. The device load 125 may charge the battery using DC voltage output from the DC/DC converter 123.

The control/communication unit 126 transmits, to the source device 110, information on an amount of the received tracking power, an amount of the dissipation power of the device load 125, and an amount of the received operation power, as will be described with reference to FIGS. 2 and 5. The amount of the received operation power is maintained within a predetermined range. The control/communication unit 126 may detect information on a charging state of a rechargeable battery (e.g., the device load 125), and may transmit the information to the source device 110. The information on the charging state may include, for example, an amount of current flowing to the rechargeable battery, an amount of voltage applied to the rechargeable battery, and/or other information known to one of ordinary skill in the art.

The control/communication unit 126 may perform in-band communication for transmitting or receiving data using a resonant frequency by demodulating a received signal obtained by detecting a signal between the target resonator 121 and the rectification unit 122, or by detecting an output signal of the rectification unit 122. In other words, the control/communication unit 126 may demodulate a message received via the in-band communication.

Additionally, the control/communication unit 126 may adjust an impedance of the target resonator 121 to modulate a signal to be transmitted to the source device 110. Specifically, the control/communication unit 126 may modulate the signal to be transmitted to the source device 110 by turning the switch unit 124 on and off. For example, the control/communication unit 126 may increase the impedance of the target resonator by turning the switch unit 124 off so that a reflected wave will be detected by the control/communication unit 115 of the source device 110. In this example, depending on whether the reflected wave is detected, the control/communication unit 115 of the source device 110 will detect a binary number "0" or "1."

The control/communication unit 126 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The control/communication unit 126 may also perform an out-of-band communication using a communication channel. The control/communication unit 126 may include a communication module, such as a ZigBee module, a Bluetooth module, or any other communication module known in the art, that the control/communication unit 126 may use to transmit or receive data to or from the source device 110 via the out-of-band communication.

Figure 2:
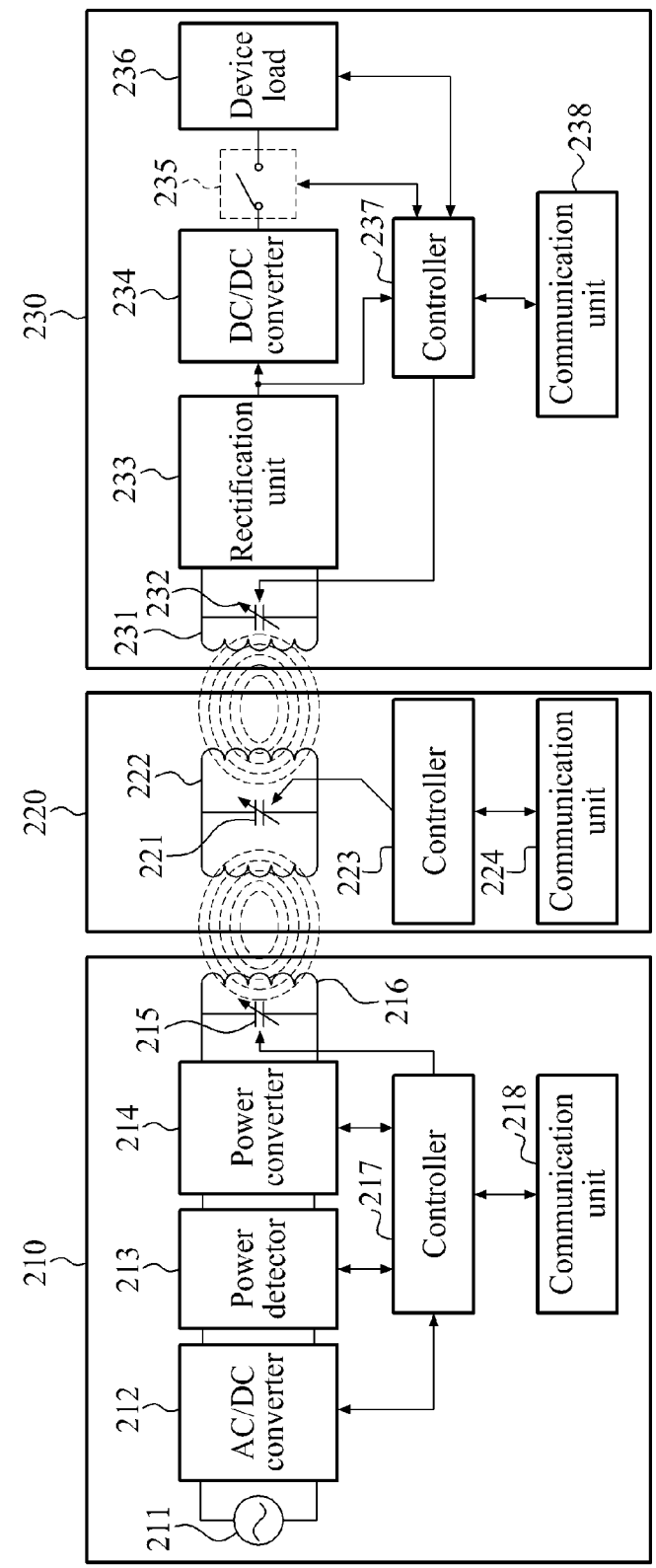
FIG. 2 is a diagram illustrating an example of a wireless power transmission system that increases a coupling efficiency by adjusting a resonant frequency.

FIG. 2 is a diagram illustrating an example of a wireless power transmission system that increases a coupling efficiency by adjusting a resonant frequency. The wireless power transmission system includes a source device 210, a relay device 220, and a target device 230.

The source device 210 includes a power supply 211, an AC/DC converter 212, a power detector 213, a power converter 214, a source resonator 216, a controller 217, and a communication unit 218. The source resonator 216 includes a variable capacitor 215.

The relay device 220 includes a relay resonator 222, a controller 223, and a communication unit 224. The relay resonator 222 includes a variable capacitor 221.

The target device 230 includes a target resonator 231, a rectification unit 233, a DC/DC converter 234, a switch unit 235, a device load 236, a controller 237, and a communication unit 238. The target resonator 231 includes a variable capacitor 232.

The power supply 211, the AC/DC converter 212, the power detector 213, the power converter 214, the rectification unit 233, the DC/DC converter 234, the switch unit 235, and the device load 236 of FIG. 2 may perform the same functions as the power supply 112, the AC/DC converter 111, the power detector 113, the power converter 114, the rectification unit 122, the DC/DC converter 123, the switch unit 124, and the device load 125 of FIG. 1, respectively. Accordingly, further description thereof is omitted herein.

Each of the communication units 218, 224, and 238 may perform an out-of-band using a communication channel. Each of the communication units 218, 224, and 238 may include a communication module, such as a ZigBee module, a Bluetooth module, or any other communication module known in the art. Each of the communication units 218, 224, and 238 may transmit or receive data between the source device 210 and the relay device 220, between the source device 210 and the target device 230, and between the relay device 220 and the target device 230, via the out-of-band communication.

The controller 217 of the source device 210 controls a wireless power to be transmitted (e.g., performs a wireless power transmission) to the source device 210 via the relay device 220 based on a predetermined reference resonant frequency. The controller 217 receives, from the target device 230 through the communication unit 218, information on an amount of a power received at the target device 230. The controller 217 determines a power transmission efficiency associated with the wireless power transmission. For example, the power transmission efficiency may be determined based on a ratio of an amount of a power transmitted to the target device 230 to the amount of the power received at the target device 230 that is included in the information.

When the power transmission efficiency is less than or equal to a predetermined reference efficiency, the controller 217 adjusts a resonant frequency of the source device 210, a resonant frequency of the relay device 220 and a resonant frequency of the target device 230. The controller 217 transmits the adjusted resonant frequency of the relay device 220 and the adjusted resonant frequency of the target device 230 to the relay device 220 and the target device 230, respectively, using the communication unit 218. The controller 217 adjusts a capacitance of the variable capacitor 215 included in the source resonator 216 to adjust a resonant frequency of the source resonator 216 to the adjusted resonant frequency of the source device 210. The controller 217 adjusts the resonant frequency of the source device 210, the resonant frequency of the relay device 220, and the resonant frequency of the target device 230, until the power transmission efficiency becomes greater than the reference efficiency.

To transmit the adjusted resonant frequency of the relay device 220 and the adjusted resonant frequency of the target device 230 to the relay device 220 and the target device 230, respectively, the controller 217 may insert resonant frequency information in a resonant frequency adjustment message, and may transmit the resonant frequency adjustment message to the relay device 220 and the target device 230. The resonant frequency information may include, for example, information on the adjusted resonant frequencies.

The controller 217 may adjust the resonant frequencies based on predetermined adjustment information included in an adjustment list. The predetermined adjustment information may include, for example, information on a change in the resonant frequency of the source device 210, a change in the resonant frequency of the relay device 220, and a change in the resonant frequency of the target device 230, based on the reference resonant frequency. Accordingly, the adjusted resonant frequency of the source device 210, the adjusted resonant frequency of the relay device 220, and the adjusted resonant frequency of the target device 230 may be identical to each other, or may be partially identical to each other, or may be different from each other.

The controller 217 repeat the wireless power transmission based on the adjusted resonant frequency of the source resonator 216. Additionally, the controller 217 may determine the power transmission efficiency associated with the repeated wireless power transmission, and may control (e.g., further adjust) the resonant frequency of the source device 210, the resonant frequency of the relay device 220 and the resonant frequency of the target device 230 to achieve a best power transmission efficiency associated with the wireless power transmission (e.g., that is greater than the reference efficiency).

The controller 223 of the relay device 220 controls the wireless power to be relayed from the source device 210 to the target device 230 based on the reference resonant frequency. When the controller 223 receives, from the source device 210, the adjusted resonant frequency of the relay device 220, the controller 223 controls the wireless power to be relayed based on the adjusted resonant frequency. In more detail, the controller 223 adjusts a capacitance of the variable capacitor 221 in the relay resonator 222 to adjust a resonant frequency of the relay resonator 222 to the adjusted resonant frequency of the relay device 220.

The controller 223 may receive the resonant frequency adjustment message from the source device 210 through the communication unit 224, and may verify reception of the adjusted resonant frequency of the relay device 220 that is included in the resonant frequency adjustment message. The resonant frequency adjustment message may include, for example, the information on the adjusted resonant frequency of the relay device 220.

The controller 237 of the target device 230 controls the wireless power to be received from the source device 210 via the relay device 220 based on the reference resonant frequency. The controller 237 determines the amount of the power received at the target device 230, and transmits, to the source device 210, the information on the amount of the received power. When the controller 237 receives, from the source device 210, the adjusted resonant frequency of the target device 230, the controller 237 controls the wireless power to be received based on the adjusted resonant frequency. In more detail, the controller 237 adjusts a capacitance of the variable capacitor 232 in the target resonator 231, to adjust a resonant frequency of the target resonator 231 to the adjusted resonant frequency of the target device 230.

The controller 237 may receive the resonant frequency adjustment message from the source device 210 through the communication unit 238, and may verify reception of the adjusted resonant frequency of the target device 230 that is included in the resonant frequency adjustment message. The resonant frequency adjustment message may include, for example, the information on the adjusted resonant frequency of the target device 230. The controller 237 may recalculate the amount of the received power every time the resonant frequency of the target device 230 and/or the target resonator 231 is adjusted, and may retransmit, to the source device 210, the information on the amount of the received power.

Figure 3:
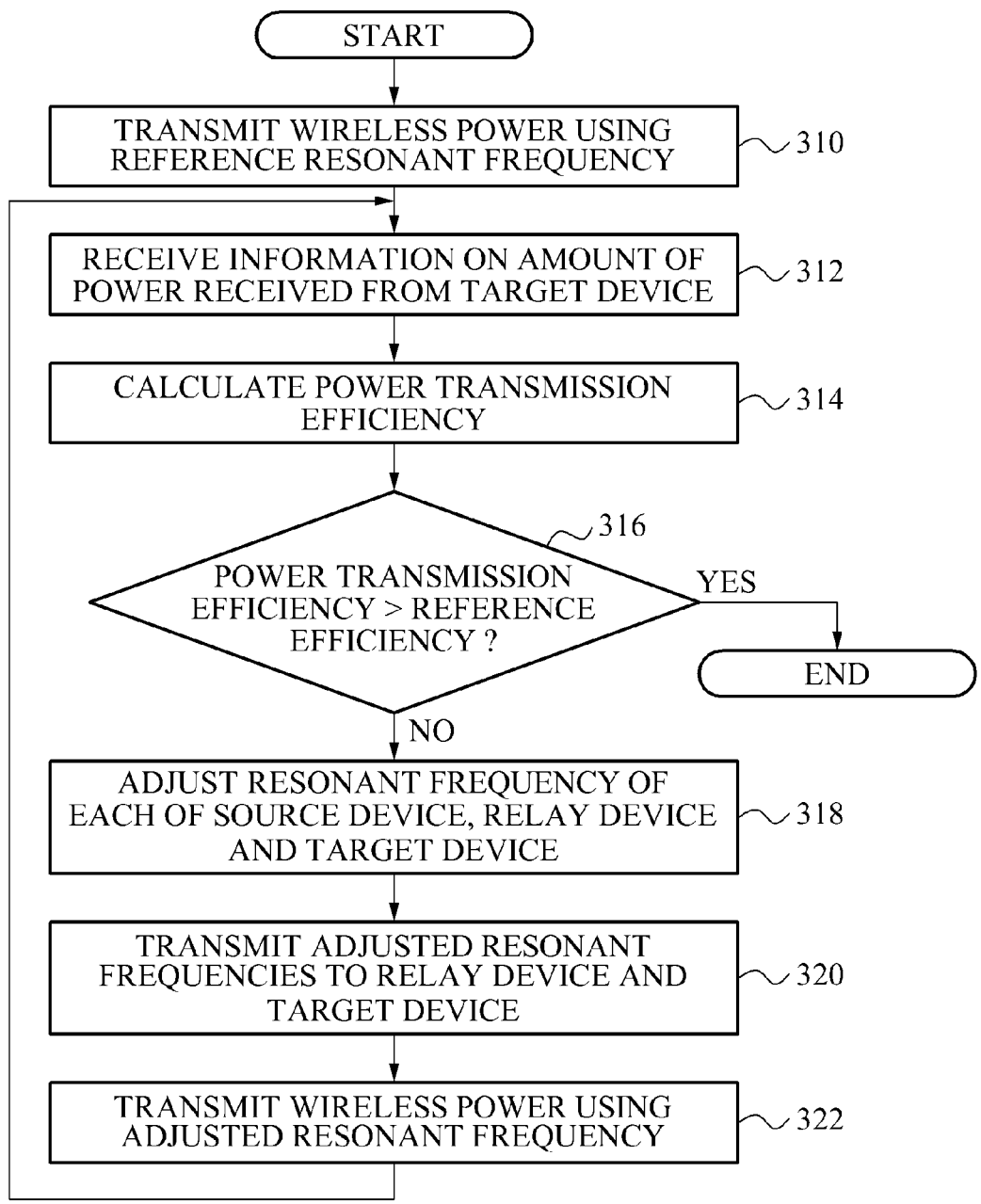
FIG. 3 is a flowchart illustrating an example of a method of transmitting wireless power by adjusting a resonant frequency in a source device of a wireless power transmission system.

FIG. 3 is a flowchart illustrating an example of a method of transmitting wireless power by adjusting a resonant frequency in a source device of a wireless power transmission system. Referring to FIG. 3, in operation 310, the source device transmits a wireless power to, e.g., a relay device and/or a target device of the wireless power transmission system using a predetermined reference resonant frequency.

In operation 312, the source device receives, from the target device, information on an amount of a power received at the target device.

In operation 314, the source device calculates a power transmission efficiency associated with the wireless power based on the information.

In operation 316, the source device determines whether the power transmission efficiency is greater than a predetermined reference efficiency. If the power transmission efficiency is not greater than the reference efficiency, the method continues in operation 318. Otherwise, the method ends.

In operation 318, the source device adjusts a resonant frequency of each of the source device, the relay device, and the target device. The resonant frequencies may be adjusted based on predetermined adjustment information included in an adjustment list. The predetermined adjustment information may include, for example, information on a change in the resonant frequency of each of the source device, the relay device, and the target device, based on the reference resonant frequency.

In operation 320, the source device transmits the adjusted resonant frequency of the relay device and the adjusted resonant frequency of the target device to the relay device and the target device, respectively.

In operation 322, the source device adjusts a resonant frequency of a source resonator included in the source device to the adjusted resonant frequency of the source device, and transmits the wireless power using the adjusted resonant frequency of the source resonator. The method returns to operation 312. Operations 312 through 322 may be repeated until the power transmission efficiency becomes greater than the reference efficiency.

Figure 4:
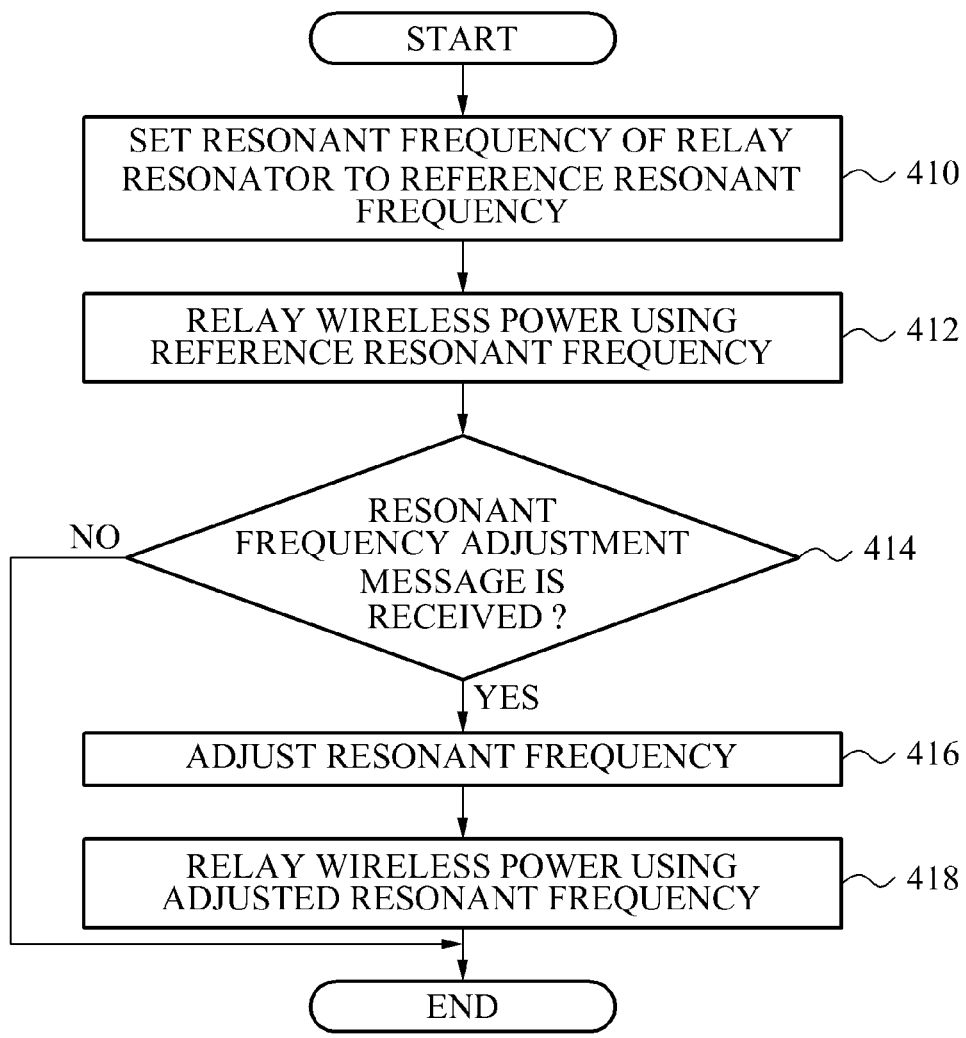
FIG. 4 is a flowchart illustrating an example of a method of relaying wireless power by adjusting a resonant frequency in a relay device of a wireless power transmission system.

FIG. 4 is a flowchart illustrating an example of a method of relaying wireless power by adjusting a resonant frequency in a relay device of a wireless power transmission system. Referring to FIG. 4, in operation 410, the relay device sets a resonant frequency of a relay resonator included in the relay device to a predetermined reference resonant frequency.

In operation 412, the relay device relays a wireless power between a source device and a target device of the wireless power transmission system using the reference resonant frequency. When the wireless power transmission system includes a plurality of relay devices, the relay device may relay the wireless power from the source device to a first relay device, from the first relay device to a second relay device, or from the second relay device to the target device.

In operation 414, the relay device determines whether a resonant frequency adjustment message is received from the source device. If the resonant frequency adjustment is received, the method continues to operation 416. Otherwise, the method ends.

In operation 416, the relay device may verify reception of resonant frequency information, namely, an adjusted resonant frequency of the relay device, that is included in the resonant frequency adjustment message, and adjusts the resonant frequency of the relay resonator to the adjusted resonant frequency of the relay device.

In operation 418, the relay device relays the wireless power using the adjusted resonant frequency of the relay resonator.

Figure 5:
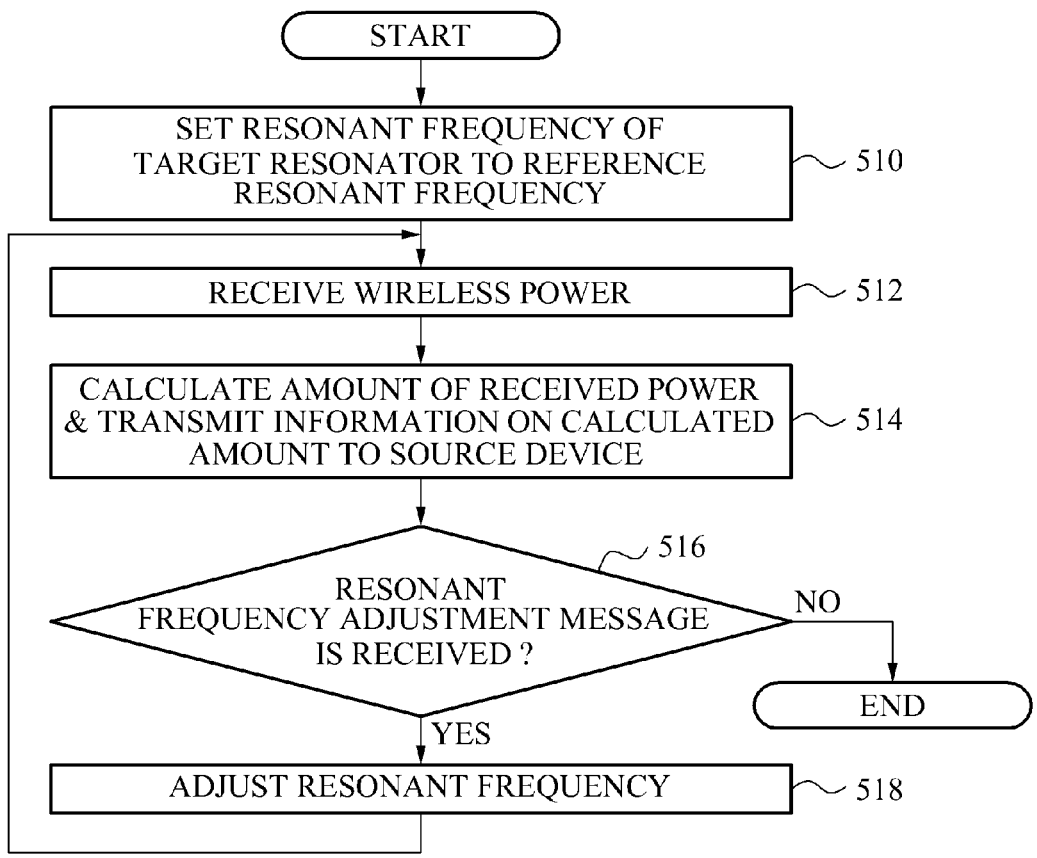
FIG. 5 is a flowchart illustrating an example of a method of receiving wireless power by adjusting a resonant frequency in a target device of a wireless power transmission system.

FIG. 5 is a flowchart illustrating an example of a method of receiving wireless power by adjusting a resonant frequency in a target device of a wireless power transmission system. Referring to FIG. 5, in operation 510, the target device sets a resonant frequency of a target resonator included in the target device to a predetermined reference resonant frequency.

In operation 512, the target device receives a wireless power from a relay device and/or a source device of the wireless power transmission system using the reference resonant frequency.

In operation 514, the target device calculates an amount of a power received at the target device, and transmits, to the source device, information on the calculated amount.

In operation 516, the target device determines whether a resonant frequency adjustment message is received from the source device. If the resonant frequency adjustment is received, the method continues to operation 518. Otherwise, the method ends.

In operation 518, the target device may verify reception of resonant frequency information, namely, an adjusted resonant frequency of the target device, that is included in the resonant frequency adjustment message, and adjusts the resonant frequency of the target resonator to the adjusted resonant frequency of the relay device. The method returns to operation 512, where the target device receives the wireless power using the adjusted resonant frequency of the target resonator.

In the following description, the term "resonator" used in the discussion of FIGS. 6A through 8B refers to both a source resonator and a target resonator.

FIGS. 6A and 6B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 6A illustrates an example of a structure of a wireless power transmitter in which a feeder 610 and a resonator 620 do not have a common ground. Referring to FIG. 6A, as an input current flows into a feeder 610 through a terminal labeled "+" and out of the feeder 610 through a terminal labeled "−", a magnetic field 630 is formed by the input current. A direction 631 of the magnetic field 630 inside the feeder 610 is into the plane of FIG. 6A, and has a phase that is opposite to a phase of a direction 633 of the magnetic field 630 outside the feeder 610. The magnetic field 630 formed by the feeder 610 induces a current to flow in a resonator 620. The direction of the induced current in the resonator 620 is opposite to a direction of the input current in the feeder 610 as indicated by the dashed arrows in FIG. 6A.

The induced current in the resonator 620 forms a magnetic field 640. Directions of the magnetic field 640 are the same at all positions inside the resonator 620. Accordingly, a direction 641 of the magnetic field 640 formed by the resonator 620 inside the feeder 610 has the same phase as a direction 643 of the magnetic field 640 formed by the resonator 620 outside the feeder 610.

Consequently, when the magnetic field 630 formed by the feeder 610 and the magnetic field 640 formed by the resonator 620 are combined, a strength of the total magnetic field inside the resonator 620 decreases inside the feeder 610 and increases outside the feeder 610. In an example in which power is supplied to the resonator 620 through the feeder 610 configured as illustrated in FIG. 6A, the strength of the total magnetic field decreases in the center of the resonator 620, but increases outside the resonator 620. In another example in which a magnetic field is randomly distributed in the resonator 620, it is difficult to perform impedance matching since an input impedance will frequently vary. Additionally, when the strength of the total magnetic field increases, an efficiency of wireless power transmission increases. Conversely, when the strength of the total magnetic field is decreases, the efficiency of wireless power transmission decreases. Accordingly, the power transmission efficiency may be reduced on average.

FIG. 6B illustrates an example of a structure of a wireless power transmitter in which a resonator 650 and a feeder 660 have a common ground. The resonator 650 includes a capacitor 651. The feeder 660 receives a radio frequency (RF) signal via a port 661. When the RF signal is input to the feeder 660, an input current is generated in the feeder 660. The input current flowing in the feeder 660 forms a magnetic field, and a current is induced in the resonator 650 by the magnetic field. Additionally, another magnetic field is formed by the induced current flowing in the resonator 650. In this example, a direction of the input current flowing in the feeder 660 has a phase opposite to a phase of a direction of the induced current flowing in the resonator 650. Accordingly, in a region between the resonator 650 and the feeder 660, a direction 671 of the magnetic field formed by the input current has the same phase as a direction 673 of the magnetic field formed by the induced current, and thus the strength of the total magnetic field increases in the region between the resonator 650 and the feeder 660. Conversely, inside the feeder 660, a direction 681 of the magnetic field formed by the input current has a phase opposite to a phase of a direction 683 of the magnetic field formed by the induced current, and thus the strength of the total magnetic field decreases inside the feeder 660. Therefore, the strength of the total magnetic field decreases in the center of the resonator 650, but increases outside the resonator 650.

An input impedance may be adjusted by adjusting an internal area of the feeder 660. The input impedance refers to an impedance viewed in a direction from the feeder 660 to the resonator 650. When the internal area of the feeder 660 is increased, the input impedance is increased. Conversely, when the internal area of the feeder 660 is decreased, the input impedance is decreased. Because the magnetic field is randomly distributed in the resonator 650 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance of the power amplifier.

Figure 7A:
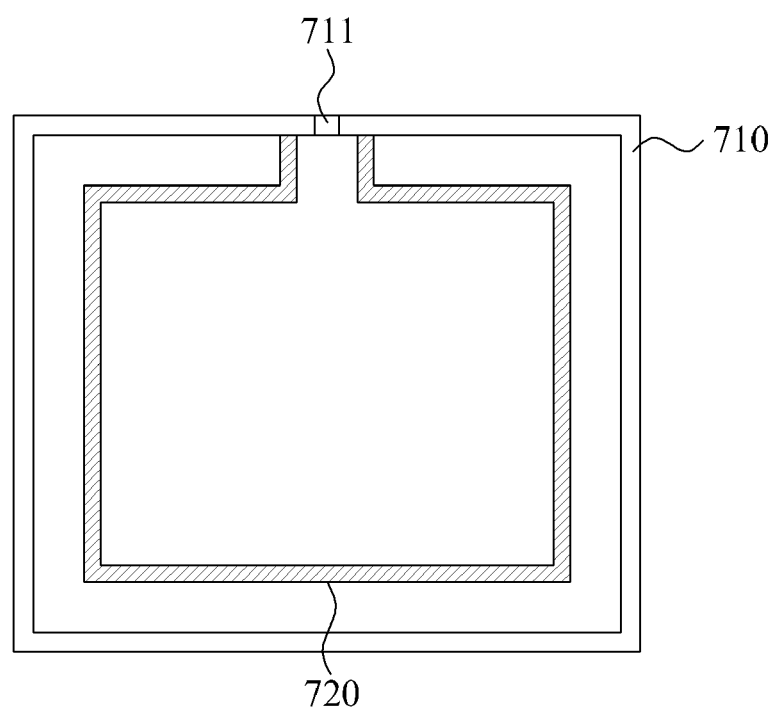
FIGS. 7A and 7B are diagrams illustrating an example of a feeding unit and a resonator of a wireless power transmitter.
Figure 7B:
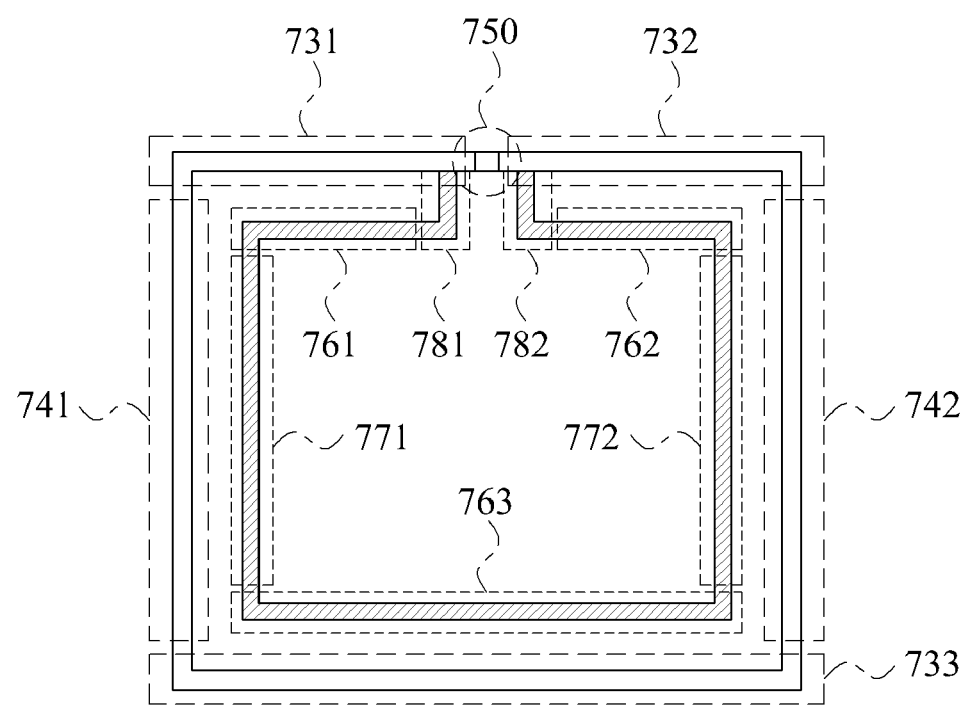

FIGS. 7A and 7B are diagrams illustrating an example of a feeding unit and a resonator of a wireless power transmitter. Referring to FIG. 7A, the wireless power transmitter includes a resonator 710 and a feeding unit 720. The resonator 710 further includes a capacitor 711. The feeding unit 720 is electrically connected to both ends of the capacitor 711.

FIG. 7B illustrates, in greater detail, a structure of the wireless power transmitter of FIG. 7A. The resonator 710 includes a first transmission line (not identified by a reference numeral in FIG. 7B, but formed by various elements in FIG. 7B as discussed below), a first conductor 741, a second conductor 742, and at least one capacitor 750.

The capacitor 750 is inserted in series between a first signal conducting portion 731 and a second signal conducting portion 732, causing an electric field to be confined within the capacitor 750. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 7B is separated into two portions that will be referred to as the first signal conducting portion 731 and the second signal conducting portion 732. A conductor disposed in a lower portion of the first transmission line in FIG. 7B will be referred to as a first ground conducting portion 733.

As illustrated in FIG. 7B, the resonator 710 has a generally two-dimensional (2D) structure. The first transmission line includes the first signal conducting portion 731 and the second signal conducting portion 732 in the upper portion of the first transmission line, and includes the first ground conducting portion 733 in the lower portion of the first transmission line. The first signal conducting portion 731 and the second signal conducting portion 732 are disposed to face the first ground conducting portion 733. A current flows through the first signal conducting portion 731 and the second signal conducting portion 732.

One end of the first signal conducting portion 731 is connected to one end of the first conductor 741, the other end of the first signal conducting portion 731 is connected to the capacitor 750, and the other end of the first conductor 741 is connected to one end of the first ground conducting portion 733. One end of the second signal conducting portion 732 is connected to one end of the second conductor 742, the other end of the second signal conducting portion 732 is connected to the other end of the capacitor 750, and the other end of the second conductor 742 is connected to the other end of the ground conducting portion 733. Accordingly, the first signal conducting portion 731, the second signal conducting portion 732, the first ground conducting portion 733, the first conductor 741, and the second conductor 742 are connected to each other, causing the resonator 710 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 750 is inserted into an intermediate portion of the first transmission line. In the example in FIG. 7B, the capacitor 750 is inserted into a space between the first signal conducting portion 731 and the second signal conducting portion 732. The capacitor 750 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 750 inserted into the first transmission line may cause the resonator 710 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 750 is a lumped element capacitor and a capacitance of the capacitor 750 is appropriately determined, the resonator 710 may have a characteristic of a metamaterial. If the resonator 710 is caused to have a negative magnetic permeability by appropriately adjusting the capacitance of the capacitor 750, the resonator 710 may also be referred to as an MNG resonator. Various criteria may be applied to determine the capacitance of the capacitor 750. For example, the various criteria may include a criterion for enabling the resonator 710 to have the characteristic of the metamaterial, a criterion for enabling the resonator 710 to have a negative magnetic permeability at a target frequency, a criterion for enabling the resonator 710 to have a zeroth order resonance characteristic at the target frequency, and any other suitable criterion. Based on any one or any combination of the aforementioned criteria, the capacitance of the capacitor 750 may be appropriately determined.

The resonator 710, hereinafter referred to as the MNG resonator 710, may have a zeroth order resonance characteristic of having a resonance frequency when a propagation constant is "0". If the MNG resonator 710 has the zeroth order resonance characteristic, the resonance frequency is independent of a physical size of the MNG resonator 710. By changing the capacitance of the capacitor 750, the resonance frequency of the MNG resonator 710 may be changed without changing the physical size of the MNG resonator 710.

In a near field, the electric field is concentrated in the capacitor 750 inserted into the first transmission line, causing the magnetic field to become dominant in the near field. The MNG resonator 710 has a relatively high Q-factor when the capacitor 750 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 7B, a magnetic core passing through the MNG resonator 710 may be provided to increase a power transmission distance.

Referring to FIG. 7B, the feeding unit 720 includes a second transmission line (not identified by a reference numeral in FIG. 7B, but formed by various elements in FIG. 7B as discussed below), a third conductor 771, a fourth conductor 772, a fifth conductor 781, and a sixth conductor 782.

The second transmission line includes a third signal conducting portion 761 and a fourth signal conducting portion 762 in an upper portion of the second transmission line, and includes a second ground conducting portion 763 in a lower portion of the second transmission line. The third signal conducting portion 761 and the fourth signal conducting portion 762 are disposed to face the second ground conducting portion 763. A current flows through the third signal conducting portion 761 and the fourth signal conducting portion 762.

One end of the third signal conducting portion 761 is connected to one end of the third conductor 771, the other end of the third signal conducting portion 761 is connected to one end of the fifth conductor 781, and the other end of the third conductor 771 is connected to one end of the second ground conducting portion 763. One end of the fourth signal conducting portion 762 is connected to one end of the fourth conductor 772, the other end of the fourth signal conducting portion 762 is connected to one end the sixth conductor 782, and the other end of the fourth conductor 772 is connected to the other end of the second ground conducting portion 763. The other end of the fifth conductor 781 is connected to the first signal conducting portion 731 at or near where the first signal conducting portion 731 is connected to one end of the capacitor 750, and the other end of the sixth conductor 782 is connected to the second signal conducting portion 732 at or near where the second signal conducting portion 732 is connected to the other end of the capacitor 750. Thus, the fifth conductor 781 and the sixth conductor 782 are connected in parallel to both ends of the capacitor 750. The fifth conductor 781 and the sixth conductor 782 are used as an input port to receive an RF signal as an input.

Accordingly, the third signal conducting portion 761, the fourth signal conducting portion 762, the second ground conducting portion 763, the third conductor 771, the fourth conductor 772, the fifth conductor 781, the sixth conductor 782, and the resonator 710 are connected to each other, causing the resonator 710 and the feeding unit 720 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 781 or the sixth conductor 782, input current flows through the feeding unit 720 and the resonator 710, generating a magnetic field that induces a current in the resonator 710. A direction of the input current flowing through the feeding unit 720 is identical to a direction of the induced current flowing through the resonator 710, thereby causing a strength of a total magnetic field to increase in the center of the resonator 710, and decrease near the outer periphery of the resonator 710.

An input impedance is determined by an area of a region between the resonator 710 and the feeding unit 720. Accordingly, a separate matching network used to match the input impedance to an output impedance of a power amplifier may not be necessary. However, if a matching network is used, the input impedance may be adjusted by adjusting a size of the feeding unit 720, and accordingly a structure of the matching network may be simplified. The simplified structure of the matching network may reduce a matching loss of the matching network.

The second transmission line, the third conductor 771, the fourth conductor 772, the fifth conductor 781, and the sixth conductor 782 of the feeding unit may have a structure identical to the structure of the resonator 710. For example, if the resonator 710 has a loop structure, the feeding unit 720 may also have a loop structure. As another example, if the resonator 710 has a circular structure, the feeding unit 720 may also have a circular structure.

Figure 8A:
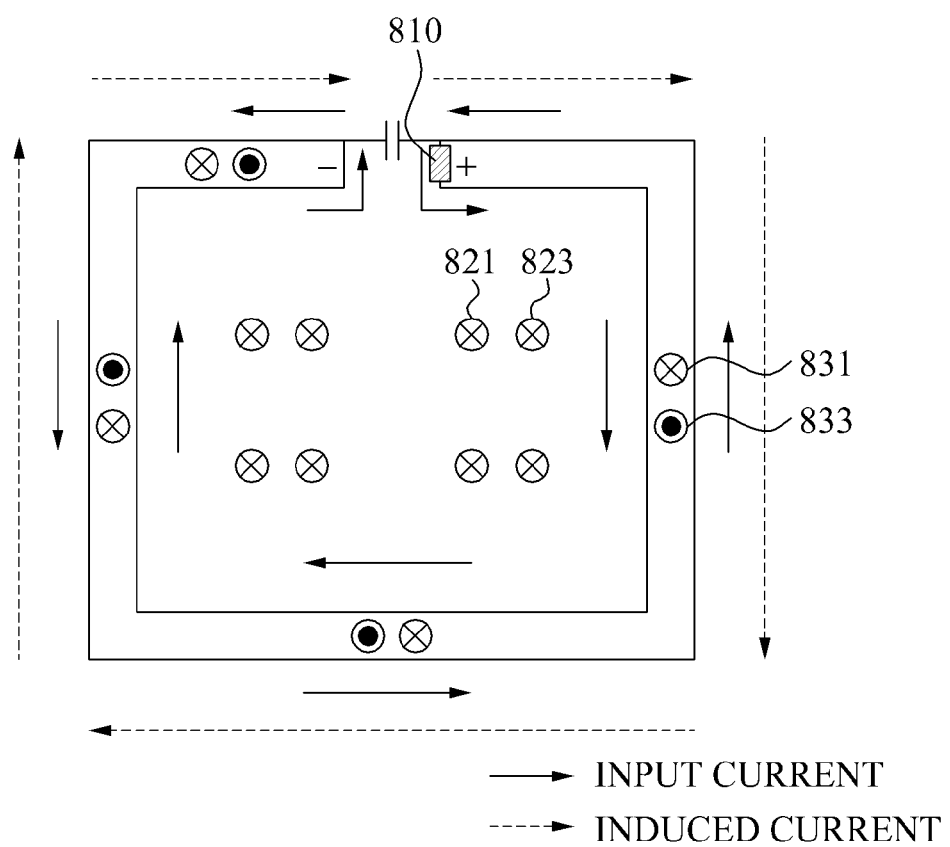
FIG. 8A is a diagram illustrating an example of a distribution of a magnetic field in a resonator that is produced by feeding of a feeding unit, of a wireless power transmitter.

FIG. 8A is a diagram illustrating an example of a distribution of a magnetic field in a resonator that is produced by feeding of a feeding unit, of a wireless power transmitter. FIG. 8A more simply illustrates the resonator 710 and the feeding unit 720 of FIGS. 7A and 7B, and the names of the various elements in FIG. 7B will be used in the following description of FIG. 8A without reference numerals.

A feeding operation may be an operation of supplying power to a source resonator in wireless power transmission, or an operation of supplying AC power to a rectification unit in wireless power transmission. FIG. 8A illustrates a direction of input current flowing in the feeding unit, and a direction of induced current flowing in the source resonator. Additionally, FIG. 8A illustrates a direction of a magnetic field formed by the input current of the feeding unit, and a direction of a magnetic field formed by the induced current of the source resonator.

Referring to FIG. 8A, the fifth conductor or the sixth conductor of the feeding unit 720 may be used as an input port 810. In FIG. 8A, the sixth conductor of the feeding unit is being used as the input port 810. An RF signal is input to the input port 810. The RF signal may be output from a power amplifier. The power amplifier may increase and decrease an amplitude of the RF signal based on a power requirement of a target device. The RF signal input to the input port 810 is represented in FIG. 8A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 8A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 8A, within the feeding unit, a direction 821 of the magnetic field generated by the input current flowing in the feeding unit is identical to a direction 823 of the magnetic field generated by the induced current flowing in the resonator. Accordingly, a strength of the total magnetic field may increases inside the feeding unit.

In contrast, as illustrated in FIG. 8A, in a region between the feeding unit and the resonator, a direction 833 of the magnetic field generated by the input current flowing in the feeding unit is opposite to a direction 831 of the magnetic field generated by the induced current flowing in the resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 8A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 8B:
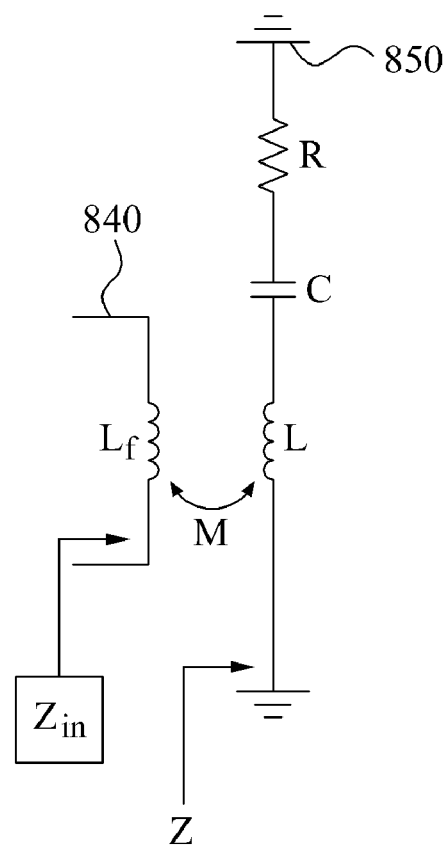
FIG. 8B is a diagram illustrating examples of equivalent circuits of a feeding unit and a resonator of a wireless power transmitter.

FIG. 8B is a diagram illustrating examples of equivalent circuits of a feeding unit and a resonator of a wireless power transmitter. Referring to FIG. 8B, a feeding unit 840 and a resonator 850 may be represented by the equivalent circuits in FIG. 8B. The feeding unit 840 is represented as an inductor having an inductance $L_f$, and the resonator 850 is represented as a series connection of an inductor having an inductance L coupled to the inductance $L_f$ of the feeding unit 840 by a mutual inductance M, a capacitor having a capacitance C, and a resistor having a resistance R. An example of an input impedance $Z_{in}$ viewed in a direction from the feeding unit 840 to the resonator 850 may be expressed by the following Equation 1:

$$Z_{in} = \frac{(\omega M)^2}{Z} \qquad (1)$$

In Equation 1, M denotes a mutual inductance between the feeding unit 840 and the resonator 850, ω denotes a resonance frequency of the feeding unit 840 and the resonator 850, and Z denotes an impedance viewed in a direction from the resonator 850 to a target device. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 840 and the resonator 850. The area of the region between the feeding unit 840 and the resonator 850 may be adjusted by adjusting a size of the feeding unit 840, thereby adjusting the mutual inductance M and the input impedance $Z_{in}$. Since the input impedance $Z_{in}$ may be adjusted by adjusting the size of the feeding unit 840, it may be unnecessary to use a separate matching network to perform impedance matching with an output impedance of a power amplifier.

In a target resonator and a feeding unit included in a wireless power receiver, a magnetic field may be distributed as illustrated in FIG. 8A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 8A, a direction of the induced current flowing in the target resonator will be identical to a direction of the induced current flowing in the feeding unit. Accordingly, for the reasons discussed above in connection with FIG. 8A, a strength of the total magnetic field will increase inside the feeding unit, and will decrease in a region between the feeding unit and the target resonator.

According to the teachings above, there is provided a wireless power transmission system that adjusts a resonant frequency of each of a source device, a relay device, and a target device. Thus, a coupling efficiency between the source device and the target device may be increased.

Figure 9A:
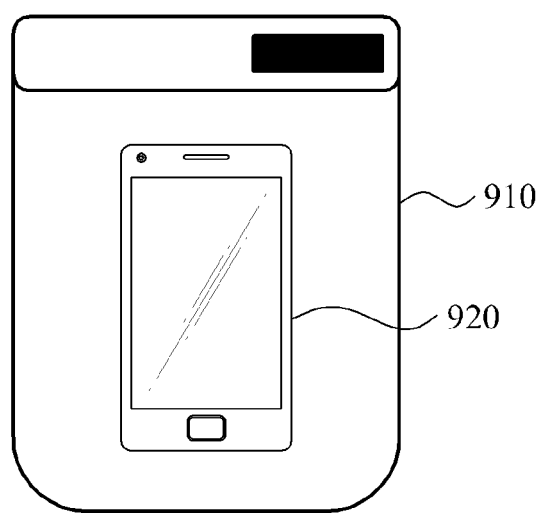
FIGS. 9A through 10B are diagrams illustrating examples of applications in which a wireless power receiver and a wireless power transmitter are mounted.

FIGS. 9A through 10B are diagrams illustrating examples of applications in which a wireless power receiver and a wireless power transmitter are mounted. FIG. 9A illustrates an example of wireless power charging between a pad 910 and a mobile terminal 920, and FIG. 9B illustrates an example of wireless power charging between pads 930 and 940 and hearing aids 950 and 960, respectively.

Referring to FIG. 9A, a wireless power transmitter is mounted in the pad 910, and a wireless power receiver is mounted in the mobile terminal 920. The pad 910 charges a single mobile terminal, namely, the mobile terminal 920.

Figure 9B:
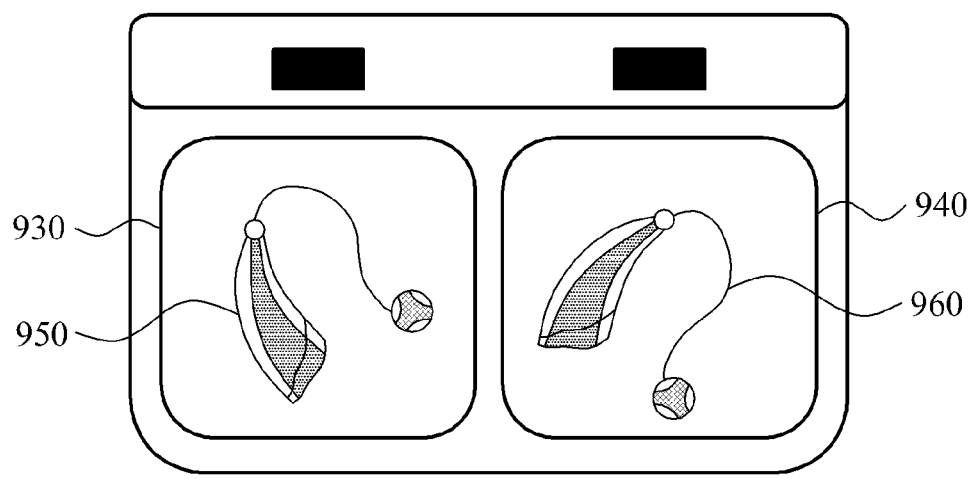

Referring to FIG. 9B, two wireless power transmitters are respectively mounted in the pads 930 and 940. The hearing aids 950 and 960 are used for a left ear and a right ear, respectively. Two wireless power receivers are respectively mounted in the hearing aids 950 and 960. The pads 930 and 940 charge two hearing aids, respectively, namely, the hearing aids 950 and 960.

Figure 10A:
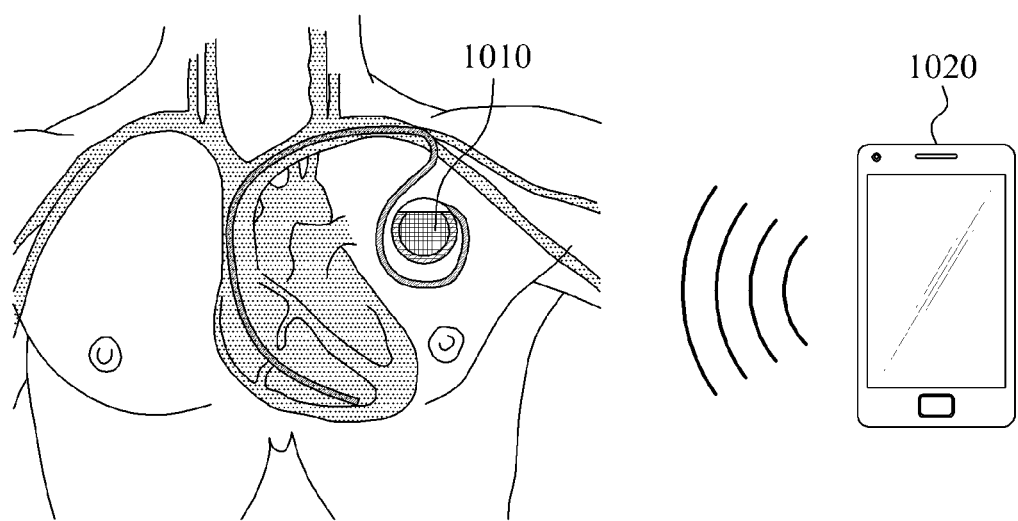
Figure 10B:
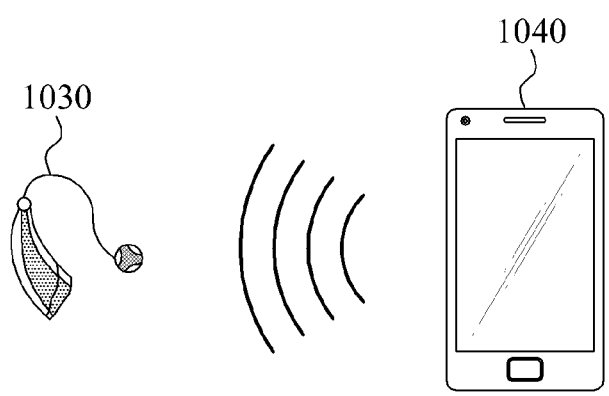

FIG. 10A illustrates an example of wireless power charging between an electronic device 1010 inserted into a human body, and a mobile terminal 1020. FIG. 10B illustrates an example of wireless power charging between a hearing aid 1030 and a mobile terminal 1040.

Referring to FIG. 10A, a wireless power transmitter and a wireless power receiver are mounted in the mobile terminal 1020. Another wireless power receiver is mounted in the electronic device 1010. The electronic device 1010 is charged by receiving power from the mobile terminal 1020.

Referring to FIG. 10B, a wireless power transmitter and a wireless power receiver are mounted in the mobile terminal 1040. Another wireless power receiver is mounted in the hearing aid 1030. The hearing aid 1030 is charged by receiving power from the mobile terminal 1040. Low-power electronic devices, for example, Bluetooth earphones, may also be charged by receiving power from the mobile terminal 1040.

Figure 11:
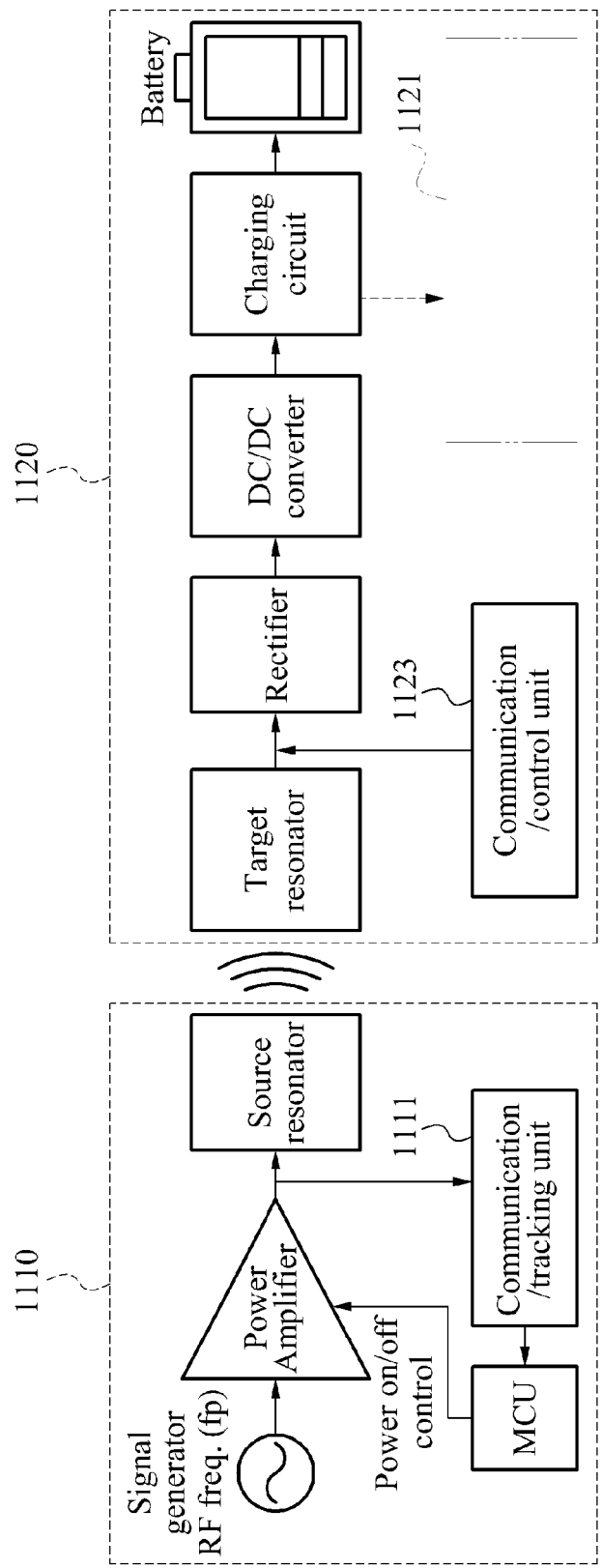
FIG. 11 is a diagram illustrating an example of a wireless power transmitter and a wireless power receiver.

FIG. 11 is a diagram illustrating an example of a wireless power transmitter and a wireless power receiver. Referring to FIG. 11, a wireless power transmitter 1110 may be mounted in each of the pad 910 of FIG. 9A and pads 930 and 940 of FIG. 9B. Additionally, the wireless power transmitter 1110 may be mounted in each of the mobile terminal 1020 of FIG. 10A and the mobile terminal 1040 of FIG. 10B.

In addition, a wireless power receiver 1120 may be mounted in each of the mobile terminal 920 of FIG. 9A and the hearing aids 950 and 960 of FIG. 9B. Further, the wireless power receiver 1120 may be mounted in each of the electronic device 1010 of FIG. 10A and the hearing aid 1030 of FIG. 10B.

The wireless power transmitter 1110 may include a similar configuration to the source device 110 of FIG. 1. For example, the wireless power transmitter 1110 may include a unit configured to transmit power using magnetic coupling.

Referring to FIG. 11, the wireless power transmitter 1110 includes a signal generator, a power amplifier, a microcontroller unit (MCU), a source resonator, and a communication/tracking unit 1111. The communication/tracking unit 1111 communicates with the wireless power receiver 1120, and controls an impedance and a resonance frequency to maintain a wireless power transmission efficiency. Additionally, the communication/tracking unit 1111 may perform similar functions to the power converter 114 and the control/communication unit 115 of FIG. 1.

The wireless power receiver 1120 may include a similar configuration to the target device 120 of FIG. 1. For example, the wireless power receiver 1120 may include a unit configured to wirelessly receive power and to charge a battery.

Referring to FIG. 11, the wireless power receiver 1120 includes a target resonator, a rectifier, a DC/DC converter, and a charging circuit. Additionally, the wireless power receiver 1120 includes a communication/control unit 1123. The communication/control unit 1123 communicates with the wireless power transmitter 1110, and performs an operation to protect overvoltage and overcurrent.

The wireless power receiver 1120 may include a hearing device circuit 1121. The hearing device circuit 1121 may be charged by a battery. The hearing device circuit 1121 may include a microphone, an analog-to-digital converter (ADC), a processor, a digital-to-analog converter (DAC), and a receiver. For example, the hearing device circuit 1121 may include the same configuration as a hearing aid.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, that independently or collectively instructs or configures the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplishes the examples disclosed herein can be easily construed by programmers skilled in the art to which the examples pertain based on and using the flow diagrams and block diagrams of the figures and their corresponding descriptions as provided herein.

As a non-exhaustive illustration only, a terminal and a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A source device of a wireless power transmission system, the source device comprising:
   a source resonator configured to transmit a wireless power based on an adjusted resonant frequency of the source device;
   a communication unit configured to receive information from a relay device and a target device, to transmit information of an adjusted resonant frequency of the relay device to the relay device, and to transmit information of an adjusted resonant frequency of the target device to the target device; and
   a controller configured to
      determine an amount of the wireless power transmitted to the target device,
      determine a power transmission efficiency based on an amount of received wireless power and the amount of the transmitted wireless power,
      adjust the resonant frequency of each of the source device, the relay device, and the target device based on predetermined adjustment information, if the power transmission efficiency is less than or equal to a predetermined reference efficiency, the predetermined adjustment information comprising information on a change in the resonant frequency of the source device, a change in the resonant frequency of the relay device, and a change in the resonant frequency of the target device, based on a predetermined reference resonant frequency; and
      repeat the determination of the power transmission efficiency and the adjustment of the resonant frequency of each of the source device, the relay device, and the target device until the power transmission efficiency is greater than the predetermined reference efficiency, wherein the received information comprises the amount of the wireless power received at the target device.

2. The device of claim 1, wherein:
   the resonator comprises a variable capacitor; and
   the controller is further configured to adjust a capacitance of the variable capacitor, in order to adjust a resonant frequency of the resonator to the adjusted resonant frequency of the source device.

3. A method in a source device of a wireless power transmission system, the method comprising:
   transmitting a wireless power;
   receiving information from a relay device and a target device;
   determining an amount of the wireless power transmitted to the target device;
   determining a power transmission efficiency based on an amount of received wireless power and the amount of the transmitted wireless power;
   determining an adjusted resonant frequency of the source device, an adjusted resonant frequency of the relay device, and an adjusted resonant frequency of the target device, if the power transmission efficiency is less than or equal to a predetermined reference efficiency; and
   adjusting the resonant frequency of each of the source device, the relay device, and the target device based on predetermined adjustment information, if the power transmission efficiency is less than or equal to a predetermined reference efficiency, the predetermined adjustment information comprising information on a change in the resonant frequency of the source device, a change in the resonant frequency of the relay device, and a change in the resonant frequency of the target device, based on a predetermined reference resonant frequency;
   transmitting information of the adjusted resonant frequency of the relay device to the relay device, and transmitting information of the adjusted resonant frequency of the target device to the target device;
   transmitting the wireless power based on the adjusted resonant frequency of the source device; and
   repeating the determining of the power transmission efficiency and the adjusting the resonant frequency of each of the source device, the relay device, and the target device until the power transmission efficiency is greater than the predetermined reference efficiency,
   wherein the received information comprises the amount of the wireless power received at the target device.

4. A wireless power transmission system comprising:
   a source device configured to
      transmit a wireless power,
      receive information from a target device,
      determine an amount of the wireless power transmitted to the target device,
      determine a power transmission efficiency based on an amount of received wireless power and the amount of the transmitted wireless power,
      adjust the resonant frequency of each of the source device, the relay device, and the target device based on predetermined adjustment information, if the power transmission efficiency is less than or equal to a predetermined reference efficiency, the predetermined adjustment information comprising information on a change in the resonant frequency of the source device, a change in the resonant frequency of the relay device, and a change in the resonant frequency of the target device, based on a predetermined reference resonant frequency, transmit information of the adjusted resonant frequency of the relay device to the relay device, and transmit information of the adjusted resonant frequency of the target device to the target device, transmit the wireless power based on the adjusted resonant frequency of the source device; and repeat the determination of the power transmission efficiency and the adjustment of the resonant frequency of each of the source device, the relay device, and the target device until the power transmission efficiency is greater than the predetermined reference efficiency;

wherein the received information comprises the amount of the wireless power received at the target device, wherein the relay device is configured to relay the wireless power based on the adjusted resonant frequency of the relay device; and wherein the target device is configured to receive the wireless power based on the adjusted resonant frequency of the target device.

5. The wireless power transmission system of claim 4, wherein:

the target device is further configured to determine an amount of the received wireless power, and transmit, to the first device, information on the amount of the received wireless power.

* * * * *